United States Patent
Zhong et al.

(10) Patent No.: US 11,933,396 B2
(45) Date of Patent: Mar. 19, 2024

(54) GEAR SHIFTING MECHANISM, TWO-SPEED GEARBOX, AND VEHICLE

(71) Applicant: Huawei Digital Power Technologies Co., Ltd., Shenzhen (CN)

(72) Inventors: Hu Zhong, Shanghai (CN); Xueyu Mei, Shanghai (CN); Huan Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 120 days.

(21) Appl. No.: 17/710,713

(22) Filed: Mar. 31, 2022

(65) Prior Publication Data

US 2022/0221053 A1    Jul. 14, 2022

(30) Foreign Application Priority Data

Mar. 31, 2021  (CN) .......................... 202110350869.9

(51) Int. Cl.
*F16H 63/30* (2006.01)
*F16H 3/44* (2006.01)
(Continued)

(52) U.S. Cl.
CPC ............. *F16H 63/304* (2013.01); *F16H 3/44* (2013.01); *F16H 57/023* (2013.01); *F16H 2003/0818* (2013.01); *F16H 2063/3056* (2013.01); *F16H 2063/3079* (2013.01); *F16H 2063/3093* (2013.01); *F16H 2063/321* (2013.01);
(Continued)

(58) Field of Classification Search
CPC ........ F16H 63/304; F16H 3/44; F16H 57/023; F16H 2003/0818; F16H 2063/3056; F16H 2063/3079; F16H 2063/3093; F16H 2063/321; F16H 2200/0021; F16H 2000/0034
See application file for complete search history.

(56) References Cited

U.S. PATENT DOCUMENTS

| 5,724,856 | A | 3/1998 | Back |
| 7,441,477 | B2 * | 10/2008 | Ho .......................... F16H 63/32 74/473.36 |

(Continued)

FOREIGN PATENT DOCUMENTS

| CN | 103511561 A | 1/2014 |
| CN | 204871456 U | 12/2015 |

(Continued)

*Primary Examiner* — Zakaria Elahmadi
(74) *Attorney, Agent, or Firm* — Leydig, Voit & Mayer, Ltd.

(57) ABSTRACT

A gear shifting mechanism includes a drive motor, a shifting drum, and a first shifting mechanism. The first shifting mechanism includes a first shifting fork, an inner shaft, an outer hub, a first coupling pin, and an elastic component. The elastic component is sleeved on the inner shaft and is located between the inner shaft and the outer hub. There is a first limiting portion and a second limiting portion between the outer hub and the inner shaft. The elastic component is located between the first limiting portion and the second limiting portion. The first limiting portion is connected to one of the outer hub and the inner shaft, and the second limiting portion is connected to the other of the outer hub and the inner shaft.

16 Claims, 12 Drawing Sheets

(51) Int. Cl.
*F16H 57/023* (2012.01)
*F16H 3/08* (2006.01)
*F16H 63/32* (2006.01)

(52) U.S. Cl.
CPC ............... *F16H 2200/0021* (2013.01); *F16H 2200/0034* (2013.01)

(56) References Cited

U.S. PATENT DOCUMENTS

| | | | |
|---|---|---|---|
| 2013/0319142 A1 | 12/2013 | Kim | |
| 2018/0135751 A1* | 5/2018 | Maki | F16H 63/32 |
| 2018/0328487 A1* | 11/2018 | Nishimoto | F16H 63/3416 |
| 2020/0200254 A1* | 6/2020 | Ishii | F16H 57/0006 |
| 2022/0163111 A1* | 5/2022 | Nishimoto | F16H 63/3466 |
| 2022/0299110 A1* | 9/2022 | Rosinski | F16H 61/32 |
| 2022/0412457 A1* | 12/2022 | Nakanishi | F16H 63/304 |

FOREIGN PATENT DOCUMENTS

| | | | | |
|---|---|---|---|---|
| CN | 205639596 U | | 10/2016 | |
| CN | 107923528 A | | 4/2018 | |
| CN | 209604492 U | * | 11/2019 | ............... F16H 3/32 |
| CN | 209604492 U | | 11/2019 | |
| DE | 1210286 B | | 2/1966 | |
| EP | 1867899 A1 | | 12/2007 | |
| FR | 8075301 A1 | | 6/2019 | |
| JP | H04044559 U | | 4/1992 | |

\* cited by examiner

GEAR SHIFTING MECHANISM, TWO-SPEED GEARBOX, AND VEHICLE

CROSS-REFERENCE TO RELATED APPLICATIONS

This application claims priority to Chinese Patent Application No. 202110350869.9, filed on Mar. 31, 2021, which is hereby incorporated by reference in its entirety.

TECHNICAL FIELD

This application relates to the field of power transmission technologies, and in particular, to a gear shifting mechanism, a two-speed gearbox, and a vehicle.

BACKGROUND

A gear shifting mechanism of an automobile gearbox is one of the most important components in an automobile transmission system. A main function of the gear shifting mechanism is to change a transmission ratio and output an appropriate traction force to wheels through a transmission shaft, to meet requirements of a vehicle in different cases. The gear shifting mechanism is an operating mechanism of the gearbox, and is usually fixed on a housing. The gear shifting mechanism drives a motor according to an indication of a driver or based on a driving status, to control the gear shifting mechanism to implement forward or backward movement of a shifting fork, so as to control opening and closing of a synchronizer, a dog clutch, or a dry clutch. Closing of the dog clutch means that two tooth surfaces of the dog clutch are meshed. When the current gear shifting mechanism controls the shifting fork to move forward, the two tooth surfaces of the dog clutch are attached tooth to tooth. In this case, the two tooth surfaces are not meshed, a drive motor continues operating, and the shifting fork cannot move forward. As a result, a motor stalling phenomenon occurs, and the motor is burnt out.

SUMMARY

This application provides a gear shifting mechanism that is capable of preventing a drive motor from being burnt out due to stalling of the drive motor when a shifting fork pushes a dog clutch to be in a tooth-to-tooth state.

According to a first aspect, this application provides a gear shifting mechanism. The gear shifting mechanism includes a drive motor, a shifting drum, and a first shifting mechanism.

The shifting drum includes a gear shifting shaft and a first guiding contour disposed in a circumferential direction of the gear shifting shaft. The first guiding contour has a path in an axial direction of the gear shifting shaft. The drive motor is capable of driving the gear shifting shaft to rotate around the axial direction of the gear shifting shaft.

The first shifting mechanism includes an inner shaft, an outer hub, a first coupling pin, a first shifting fork, and an elastic component. The outer hub is sleeved on the inner shaft and is capable of moving relative to an axial direction of the inner shaft. The outer hub and the gear shifting shaft are movably connected in the axial direction of the gear shifting shaft. The outer hub and the gear shifting shaft are fixedly connected in the circumferential direction of the gear shifting shaft. One end of the first coupling pin is fixed on an outer side of the outer hub, and the other end of the first coupling pin is inserted into the first guiding contour and is capable of sliding in the first guiding contour. The first shifting fork is fixed on the inner shaft and is located on the outer side of the outer hub.

The elastic component is sleeved on the inner shaft and is located between the inner shaft and the outer hub. There is a first limiting portion and a second limiting portion between the outer hub and the inner shaft. The second limiting portion is located on a side, of the first limiting portion, that is away from the first shifting fork. The elastic component is located between the first limiting portion and the second limiting portion in the axial direction of the inner shaft. The first limiting portion is connected to one of the outer hub and the inner shaft, and the second limiting portion is connected to the other of the outer hub and the inner shaft.

In this application, a benefit of disposing the elastic component between the outer hub and the inner shaft lies in that, the elastic component can continue absorbing an acting force when a first gear shifting tooth portion and a second gear shifting tooth portion are attached to each other, to absorb an axial acting force that occurs when a dog clutch is in a tooth-to-tooth state, thereby preventing the drive motor from being burnt out due to stalling of the drive motor.

In a possible implementation, an orthographic projection of the first guiding contour in the axial direction of the gear shifting shaft is a straight line with a specific length.

In a possible implementation, the first guiding contour is a groove type guiding contour or an opening type guiding contour.

In a possible implementation, the first coupling pin is connected and fixed to the outer hub through soldering or integral molding or by using a screw.

In an implementation, the first limiting portion may be connected and fixed to one of the outer hub and the inner shaft through soldering or integral molding, and the second limiting portion may be connected and fixed to the other of the outer hub and the inner shaft through soldering or integral molding.

In a possible implementation, two ends of the elastic component are fixedly connected to the first limiting portion and the second limiting portion respectively.

In a possible implementation, a first end of the elastic component may be fixedly connected to the first limiting portion through soldering or by using a hook, or the like, and a second end of the elastic component may be fixedly connected to the second limiting portion through soldering or by using a hook, or the like. Shapes of structures of the first limiting portion and the second limiting portion are not limited. The first limiting portion and the second limiting portion may be bosses, snap rings, or the like. The elastic component may be a spring, a clip, or the like.

In a possible implementation, two ends of the elastic component abut against the first limiting portion and the second limiting portion respectively.

In an implementation, a blocking portion is further disposed on a side, of the first limiting portion, that is away from the second limiting portion, and the blocking portion is fixedly connected to the inner shaft.

In some implementations, a first end of the elastic component is fixedly connected to the first limiting portion, and a second end of the elastic component abuts against the second limiting portion. In some implementations, a first end of the elastic component abuts against the first limiting portion, and a second end of the elastic component is fixedly connected to the second limiting portion.

In some implementations, the first shifting fork is adjacent to the first limiting portion, and orthographic projections of the first limiting portion and the first shifting fork on a radial profile of the inner shaft at least partially overlap.

In a possible implementation, the first shifting mechanism further includes a hub-rotation limiting component. One end of the hub-rotation limiting component is disposed with a first limiting portion sleeved on the outer hub. A first limiting plane is disposed on an inner surface of the first limiting portion. A second limiting plane matching the first limiting plane is disposed on the outer hub. The first limiting plane is attached to the second limiting plane. The other end of the hub-rotation limiting component is disposed with a second limiting portion. The second limiting portion includes a limiting curved surface that is concave toward the first limiting portion. The limiting curved surface surrounds a part of a surface of the gear shifting shaft and is spaced from the gear shifting shaft.

In a possible implementation, the gear shifting mechanism further includes a worm and a worm gear that are meshed with each other. The worm is connected to the drive motor. The worm gear is sleeved on the gear shifting shaft and is fixedly connected to the gear shifting shaft. When the drive motor operates, the worm is driven to rotate, and the worm drives the worm gear to rotate, so as to drive the gear shifting shaft to rotate.

In a possible implementation, the second guiding contour and the worm gear are fixedly connected, and may be integrally formed.

In a possible implementation, the shifting drum further includes a second guiding contour disposed in the circumferential direction of the gear shifting shaft. The second guiding contour has a path in the axial direction of the gear shifting shaft.

The gear shifting mechanism further includes a second shifting mechanism. The second shifting mechanism includes a second coupling pin, a second shifting fork, and a supporting shaft. The second coupling pin is connected to a first end of the second shifting fork and is located in the second guiding contour. A via is disposed in the middle of the second shifting fork. The supporting shaft is inserted into the via. The second shifting fork is capable of rotating relative to the supporting shaft. When the gear shifting shaft rotates, the second coupling pin and the first end of the first shifting fork are pushed to slide in the axial direction of the gear shifting shaft, and a second end of the second shifting fork moves in a direction opposite to that of the first end of the first shifting fork through the supporting shaft.

In a possible implementation, a distance between the first end of the second shifting fork and the supporting shaft is greater than a distance between the second end of the second shifting fork and the supporting shaft.

In a possible implementation, an end face of the second end of the second shifting fork is an arc surface.

In a possible implementation, the second end of the second shifting fork includes at least two supporting points.

In a possible implementation, the second shifting mechanism further includes a push pin, and the second end of the second shifting fork abuts against one end of the push pin.

In a possible implementation, the second end of the second shifting fork is configured to be disconnected from and connected to a second gear shifting connection mechanism. The second gear shifting connection mechanism is a friction clutch. A path, in the second guiding contour, that is used to control connection and disconnection of the friction clutch is a curved path.

According to a second aspect, this application provides a two-speed gearbox. The two-speed gearbox includes a first gear shifting connection mechanism and the gear shifting mechanism according to any one of the foregoing implementations. The first gear shifting connection mechanism is connected to the first shifting fork. The first shifting fork controls connection and disconnection of the first gear shifting connection mechanism through axial movement.

In a possible implementation, the two-speed gear shifting mechanism further includes a second gear shifting connection mechanism. The second shifting fork controls connection and disconnection of the second gear shifting connection mechanism through axial movement.

In a possible implementation, the two-speed gearbox further includes a first gear apparatus and a second gear apparatus. The first gear apparatus includes a first gear and a first rotary shaft. When the first gear shifting connection mechanism is in a connected state, the first gear is connected to the first rotary shaft. In this case, the two-speed gearbox may transmit a first shifting power through the first gear and the first rotary shaft. The first shifting power is at a low gear. When the first gear shifting connection mechanism is in a disconnected state, the first gear is disconnected from the first rotary shaft. In this case, no first shifting power can be transmitted between the first gear and the first rotary shaft. The second gear apparatus includes a second gear and a second rotary shaft. When the second gear shifting connection mechanism is in a connected state, the second gear is connected to the second rotary shaft. In this case, the two-speed gearbox may transmit a second shifting power through the second gear and the second rotary shaft. The second shifting power is at a high gear. When the second gear shifting connection mechanism is in a disconnected state, the second gear is disconnected from the second rotary shaft. In this case, no second shifting power can be transmitted between the second gear and the second rotary shaft.

According to a third aspect, this application provides a vehicle. The vehicle includes front wheels, rear wheels, a vehicle body connected between the front wheels and the rear wheels, and the foregoing two-speed gearbox. The two-speed gearbox is mounted on the vehicle body. The vehicle further includes a reduction gear and a differential. An intermediate shaft in the two-speed gearbox is connected to the final gear. The differential is connected between two front wheels or between the front wheels and the rear wheels. The final gear can reduce a rotational speed of the intermediate shaft. The differential is configured to adjust a difference between rotational speeds of gears. The vehicle includes an automobile, an electric vehicle, or a special operation vehicle. The electric vehicle includes a two-wheeled, three-wheeled, or four-wheeled electric vehicle. The special operation vehicle includes a variety of vehicles with specific functions, for example, an engineering rescue vehicle, a sprinkler vehicle, a sewage suction vehicle, a cement mixer truck, a lifting vehicle, and a medical vehicle.

BRIEF DESCRIPTION OF DRAWINGS

To describe technical solutions in embodiments of this application more clearly, the following briefly describes the accompanying drawings used in the embodiments of this application.

DESCRIPTION OF EMBODIMENTS

The following describes the technical solutions in the embodiments of this application with reference to the accompanying drawings in the embodiments of this application. The described embodiments are merely a part but not all of the embodiments of this application.

The terms such as "first" and "second" in this specification are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

In addition, in this specification, orientation terms such as "top" and "bottom" are defined relative to orientations of structures in the accompanying drawings. It should be understood that these orientation terms are relative concepts used for relative description and clarification, and may correspondingly change according to changes in the orientations of the structures in the accompanying drawings.

Figure 1:
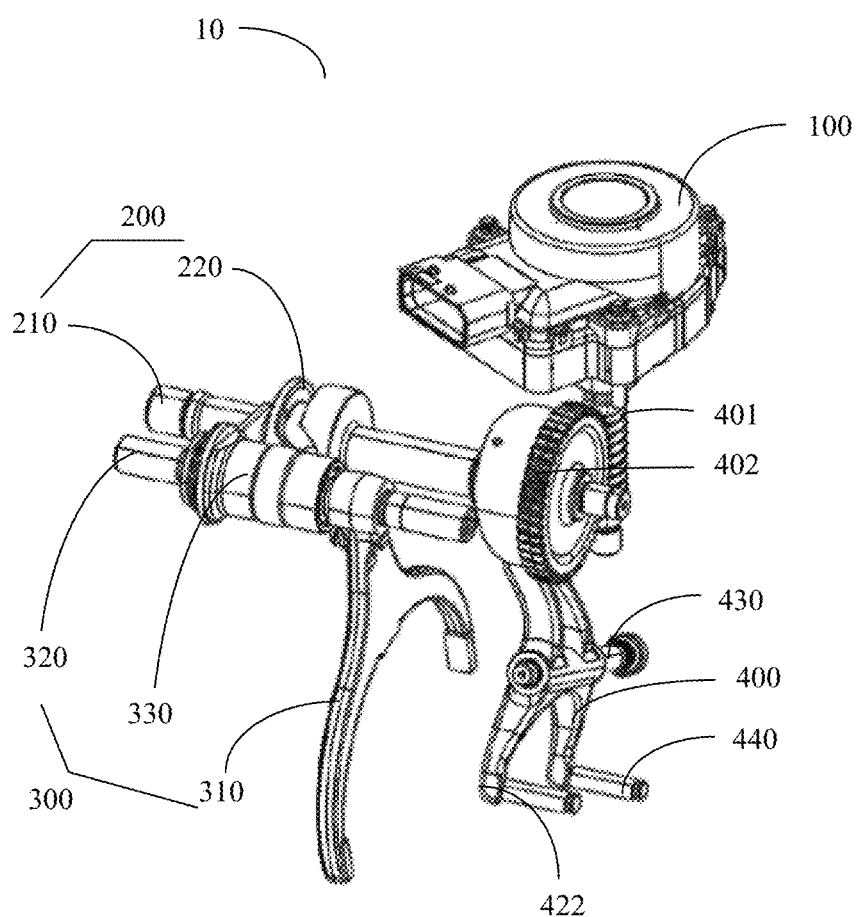
FIG. 1 is a schematic diagram of a structure of a gear shifting mechanism according to an implementation of this application.
Figure 2:
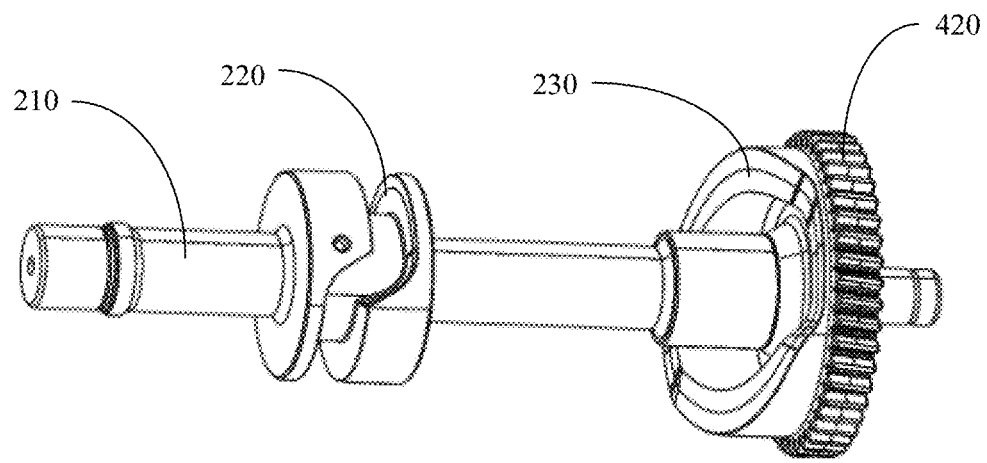
FIG. 2 is a schematic diagram of a structure of a shifting drum according to an implementation of this application.
Figure 3:
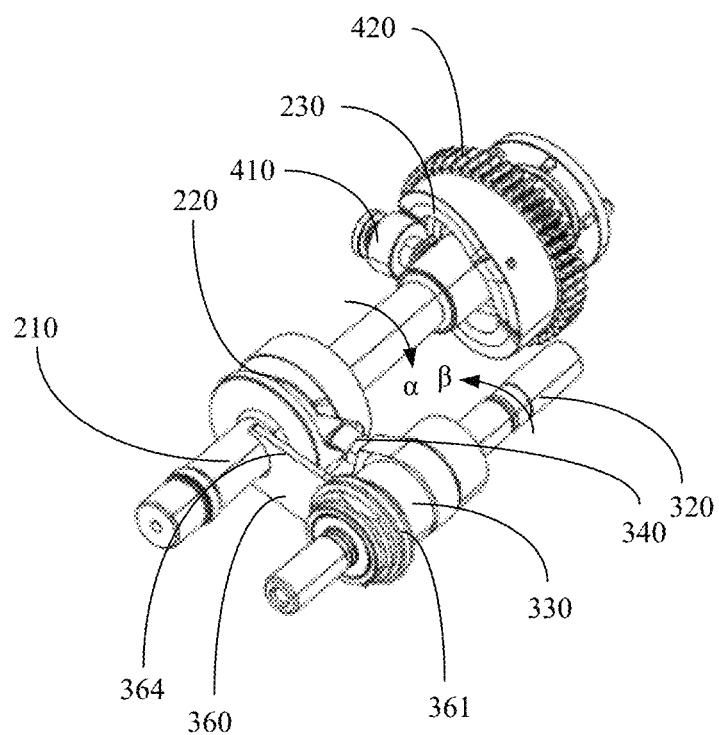
FIG. 3 is a schematic diagram of locations of a shifting drum and a first shifting structure in a gear shifting mechanism according to an implementation of this application.

Refer to FIG. 1, FIG. 2, and FIG. 3. An implementation of this application provides a gear shifting mechanism 10. The gear shifting mechanism 10 includes a drive motor 100, a shifting drum 200, and a first shifting mechanism 300.

The shifting drum 200 includes a gear shifting shaft 210 and a first guiding contour 220 disposed in a circumferential direction of the gear shifting shaft 210. The first guiding contour 220 has a path in an axial direction of the gear shifting shaft 210. The drive motor 100 is capable of driving the gear shifting shaft 210 to rotate around the axial direction of the gear shifting shaft 210. The path of the first guiding contour 220 encircles the gear shifting shaft 210 once in the circumferential direction of the gear shifting shaft 210, and has a specific path in the axial direction of the gear shifting shaft 210. In other words, an orthographic projection of the first guiding contour 220 in the axial direction of the gear shifting shaft 210 is a straight line with a specific length. Therefore, a component located in the first guiding contour 220 can be guided to move in the axial direction of the gear shifting shaft 210. A specific path of the first guiding contour 220 may be arranged according to an actual requirement. The first guiding contour 220 is but is not limited to a groove type guiding contour or an opening type guiding contour, and is a groove type guiding contour in this implementation. The groove type guiding contour is a groove structure that has an opening only on one side and has a groove bottom on the other side. The opening type guiding contour is a guiding contour having only one sliding surface, and a component slides on the sliding surface. For example, 230 in FIG. 2 indicates an opening type guiding contour.

Figure 4:
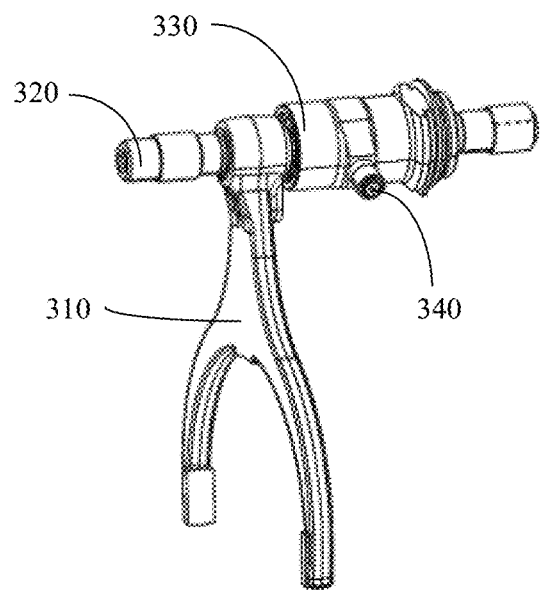
FIG. 4 is a schematic diagram of a structure of a first shifting structure according to an implementation of this application.
Figure 5:
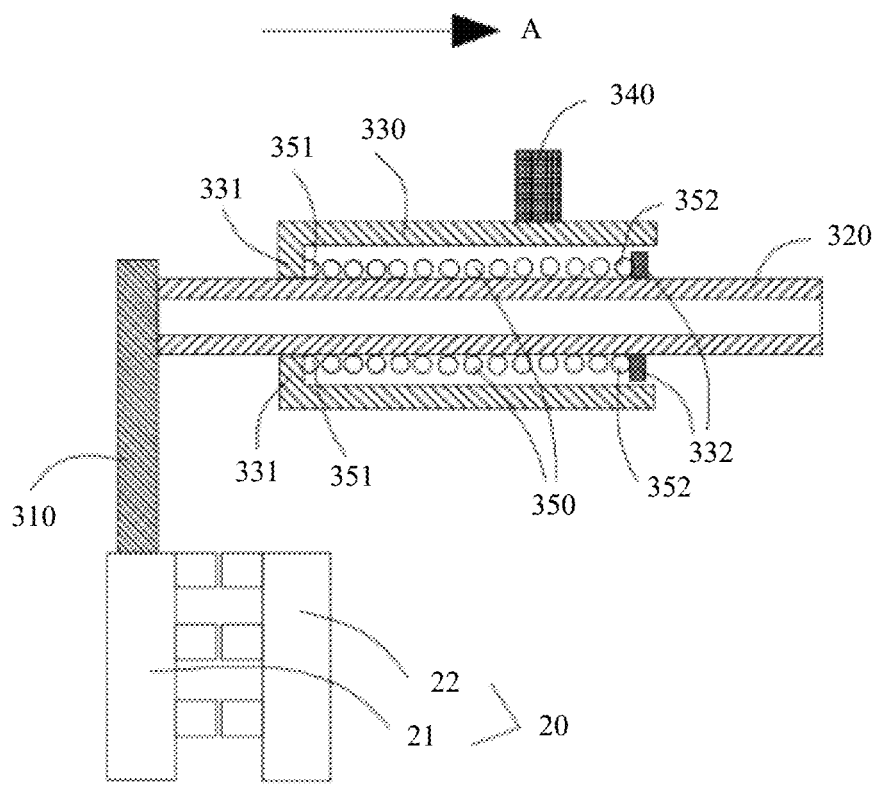
FIG. 5 is a cross-sectional view of a first shifting structure according to an implementation of this application.

Refer to FIG. 3 and FIG. 4. The first shifting mechanism 300 includes a first shifting fork 310, an inner shaft 320, an outer hub 330, a first coupling pin 340, and an elastic component 350 (as shown in FIG. 5). The outer hub 330 is sleeved on the inner shaft 320 and is capable of moving relative to an axial direction of the inner shaft 320. The outer hub 330 and the gear shifting shaft 210 are movably connected in the axial direction of the gear shifting shaft 210 (refer to FIG. 4). The outer hub 330 and the gear shifting shaft 210 are fixedly connected in the circumferential direction of the gear shifting shaft 210. To be specific, the outer hub 330 can move only relative to the gear shifting shaft 210 in the axial direction of the gear shifting shaft 210, but cannot rotate relative to the gear shifting shaft 210 in the circumferential direction of the gear shifting shaft 210, and the outer hub 33 sleeved on the inner shaft 320 cannot rotate relative to the gear shifting shaft 210 around the axial direction of the gear shifting shaft 210, either. In this implementation, the outer hub 330 is further prevented, by using a hub-rotation limiting component 360, from rotating on its own axis around the inner shaft 320 (as shown in FIG. 3). Usually, a housing is disposed outside the gear shifting mechanism 10. The inner shaft 320 and the gear shifting shaft 210 are limited on the housing, so that the inner shaft 320 can move relative to the gear shifting shaft 210 in the axial direction of the gear shifting shaft 210, and the gear shifting shaft 210 can only rotate on its own axis, but cannot move in its own axial direction. A manner of limiting the inner shaft 320 and the gear shifting shaft 210 on the housing is not limited in this application, provided that the inner shaft 320 can move relative to the gear shifting shaft 210 in the axial direction of the gear shifting shaft 210 rather than being fixedly locked.

One end of the first coupling pin 340 is fixed to an outer side of the outer hub 330 (as shown in FIG. 3), and the other end of the first coupling pin 340 is inserted into the first guiding contour 220 and is capable of sliding in the first guiding contour 220. The first coupling pin 340 may be connected and fixed to the outer hub 330 through soldering or integral molding or by using a screw. Because the outer hub 330 can move only relative to the gear shifting shaft 210 in the axial direction of the gear shifting shaft 210, but cannot rotate around the axial direction of the gear shifting shaft 210, the first coupling pin 340 connected to the outer hub 330 can also move only relative to the gear shifting shaft 210 in the axial direction of the gear shifting shaft 210, but cannot rotate around the axial direction of the gear shifting shaft 210.

The first shifting fork 310 is fixed on the inner shaft 320 and is located on the outer side of the outer hub 330 (as shown in FIG. 4). When the inner shaft 320 moves in an axial direction, the first shifting fork 310 may be driven to move in the axial direction of the inner shaft 320.

Refer to FIG. 5. The elastic component 350 is sleeved on the inner shaft 320 and is located between the inner shaft 320 and the outer hub 330. There is a first limiting portion 331 and a second limiting portion 332 between the outer hub 330 and the inner shaft 320. The second limiting portion 332 is located on a side, of the first limiting portion 331, that is away from the first shifting fork 310. The elastic component 350 is located between the first limiting portion 331 and the second limiting portion 332 in an axial direction of the inner shaft 320. The first limiting portion 331 is connected to one of the outer hub 330 and the inner shaft 320, and the second limiting portion 332 is connected to the other of the outer hub 330 and the inner shaft 320.

In this implementation, the first limiting portion 331 is connected to the outer hub 330, and the second limiting portion 332 is connected to the inner shaft 320. The first limiting portion 331 may be connected and fixed to the outer hub 330 through soldering or integral molding. The second limiting portion 332 may be connected and fixed to the inner shaft 320 through soldering or integral molding.

In this implementation, a first end 351 of the elastic component 350 is fixedly connected to the first limiting portion 331, and a second end 352 of the elastic component 350 is fixedly connected to the second limiting portion 332, to fixedly connect the first end 351 of the elastic component 350 to the outer hub 330, and fixedly connect the second end 352 of the elastic component 350 to the inner shaft 320. The first end 351 of the elastic component 350 may be fixedly connected to the first limiting portion 331 through soldering or by using a hook, or the like. The second end 352 of the elastic component 350 may be fixedly connected to the second limiting portion 332 through soldering or by using a hook, or the like. Shapes of structures of the first limiting portion 331 and the second limiting portion 332 are not limited. The first limiting portion 331 and the second limiting portion 332 may be bosses, snap rings, or the like. The elastic component 350 may be a spring, a clip, or the like.

The following describes an operating process of the first gear shifting mechanism 300 with reference to FIG. 1, FIG. 3, and FIG. 5. When the drive motor 100 operates, the gear shifting shaft 210 is driven to rotate around the axial direction of the gear shifting shaft 210. The first coupling pin 340 and the outer hub 330 can move only relative to the gear shifting shaft 210 in the axial direction of the gear shifting shaft 210, but cannot rotate around the axial direction of the gear shifting shaft 210, and the first guiding contour 220 has a path in the axial direction of the gear shifting shaft 210. Therefore, when the gear shifting shaft 210 rotates, the first coupling pin 340 slides in the axial direction of the gear shifting shaft 210 within a specific stroke range along with rotation of the shifting drum 200, the outer hub 330 follows the first coupling pin 340 to move in the axial direction of the gear shifting shaft 210 toward a direction A (as shown in FIG. 5), the outer hub 330 drives, by using the first limiting portion 331, the first end 351 of the elastic component 350 to move in the axial direction toward the direction A, and the second end 352 of the elastic component 350 is driven by a force of the first end 351 to push, by using the second limiting portion 332, the inner shaft 320 to move in the axial direction toward the direction A, and drive the first shifting fork 310 fixedly connected to the inner shaft 320 to move in the axial direction toward the direction A.

Figure 17:
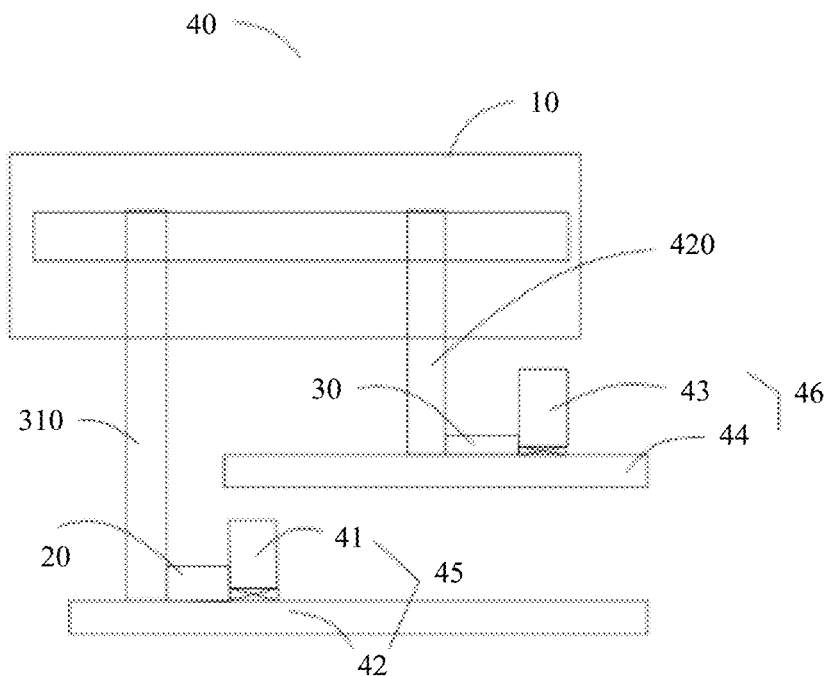
FIG. 17 is a schematic diagram of a structure of a two-speed gearbox according to an implementation of this application.

The first shifting fork 310 controls connection and disconnection of a first gear shifting connection mechanism 20 through axial movement. The first gear shifting connection mechanism 20 is capable of switching between a connected state and a disconnected state (as shown in FIG. 17). The first shift coupling mechanism 20 is a component in a first gear apparatus of a two-speed gearbox 40. The first gear shifting connection mechanism 20 is not limited to a clutch or synchronizer. The axial movement of the first shifting fork 310 can control axial movement of the clutch or the synchronizer. The first gear shifting connection mechanism 20 is configured to connect a first gear 41 and a first rotary shaft 42 in the first gear apparatus. When the first gear shifting connection mechanism 20 is in the connected state, the first gear 41 is connected to the first rotary shaft 42. In this case, the two-speed gearbox 40 may transmit a first shifting power through the first gear 41 and the first rotary shaft 42. The first shifting power is at a low gear. When the first gear shifting connection mechanism 20 is in the disconnected state, the first gear 41 is disconnected from the first rotary shaft 42. In this case, no first shifting power can be transmitted between the first gear 41 and the first rotary shaft 42.

Figure 6:
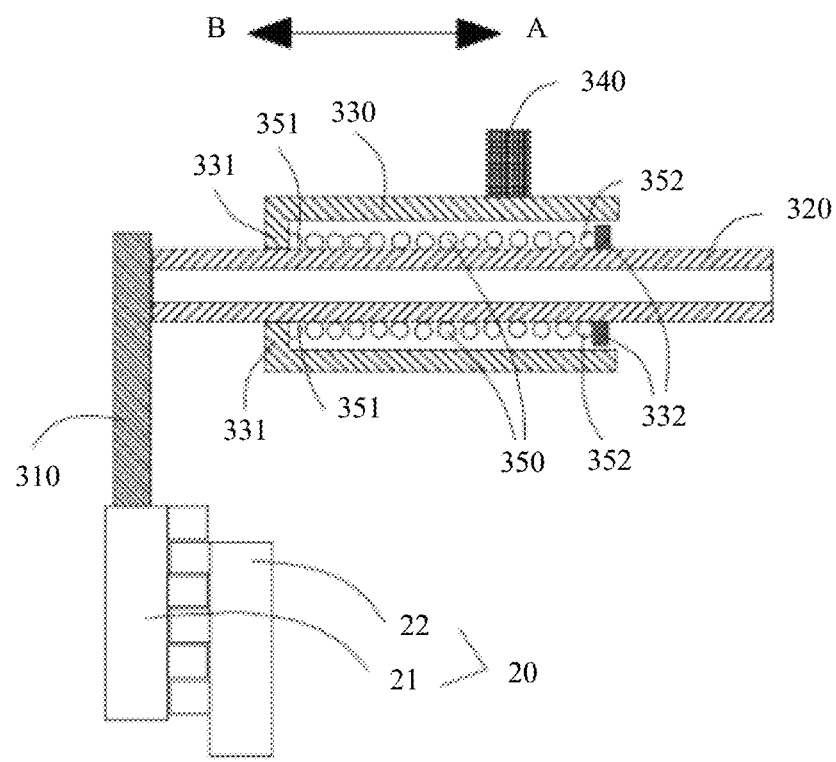
FIG. 6 is a cross-sectional view of a first shifting structure according to an implementation of this application.

Continue to refer to FIG. 5. In this implementation, the first gear shifting connection mechanism 20 is a dog clutch, and the first gear shifting connection mechanism 20 includes a first gear shifting tooth portion 21 and a second gear shifting tooth portion 22. An end, of the first shifting fork 310, that is away from the inner shaft 320 is connected to the first gear shifting tooth portion 21. As shown in FIG. 5, when the first shifting fork 310 moves in the axial direction toward the direction A and drives the first gear shifting tooth portion 21 and the second gear shifting tooth portion 22 to be attached tooth to tooth, the first gear shifting tooth portion 21 and the second gear shifting tooth portion 22 have not been meshed. The first coupling pin 340 continues moving in the axial direction toward the direction A to a target location, the outer hub 330 is driven to continue compressing the elastic component 350, and the elastic component 350 absorbs an acting force that drives movement to the target location. As shown in FIG. 6, when a rotational speed of a wheel fluctuates during driving, the fluctuation is transmitted to the first gear shifting connection mechanism 20, so that the first gear shifting tooth portion 21 and the second gear shifting tooth portion 22 are staggered at a moment when the rotational speed fluctuates. The acting force absorbed by the elastic component 350 is released, so that the first gear shifting tooth portion 21 and the second gear shifting tooth portion 22 are meshed.

In this application, a benefit of disposing the elastic component 350 between the outer hub 330 and the inner shaft 320 lies in that, the elastic component 350 can continue absorbing an acting force when the first gear shifting tooth portion 21 and the second gear shifting tooth portion 22 are attached to each other, to absorb an axial acting force that occurs when the dog clutch is in a tooth-to-tooth state, thereby preventing the drive motor 100 from being burnt out due to stalling of the drive motor 100.

When the first gear shifting connection mechanism 20 needs to be disconnected, the first shifting fork 310 moves in an opposite direction, that is, moves in the axial direction toward a direction B, to detach the first gear shifting tooth portion 21 from the second gear shifting tooth portion 22.

Figure 7:
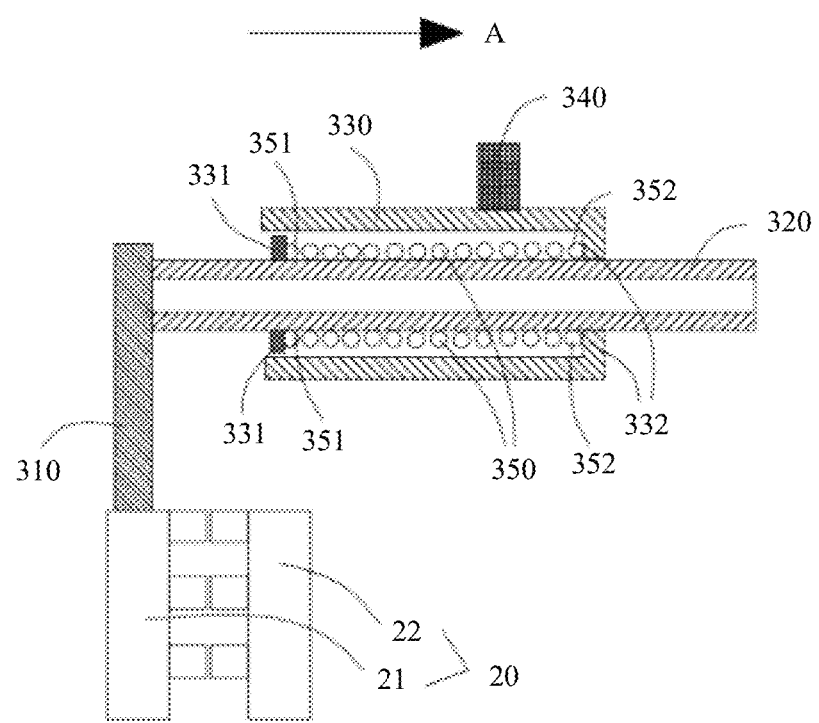
FIG. 7 is a cross-sectional view of a first shifting structure according to an implementation of this application.

Refer to FIG. 7. A difference from the implementation shown in FIG. 5 lies in that, in a possible implementation, the first limiting portion 331 is fixedly connected to the inner shaft 320, and the second limiting portion 332 is fixedly connected to the outer hub 330. When the first coupling pin 340 moves in the axial direction toward the direction A, the outer hub 330 drives, by using the second limiting portion 332, the second end 352 of the elastic component 350 to move in the axial direction toward the direction A, and the first end 351 of the elastic component 350 is driven by a pulling force of the second end 352 to pull the inner shaft 320 to move in the axial direction toward the direction A, and drive the first shifting fork 310 fixedly connected to the inner shaft 320 to move in the axial direction toward the direction A.

Figure 8:
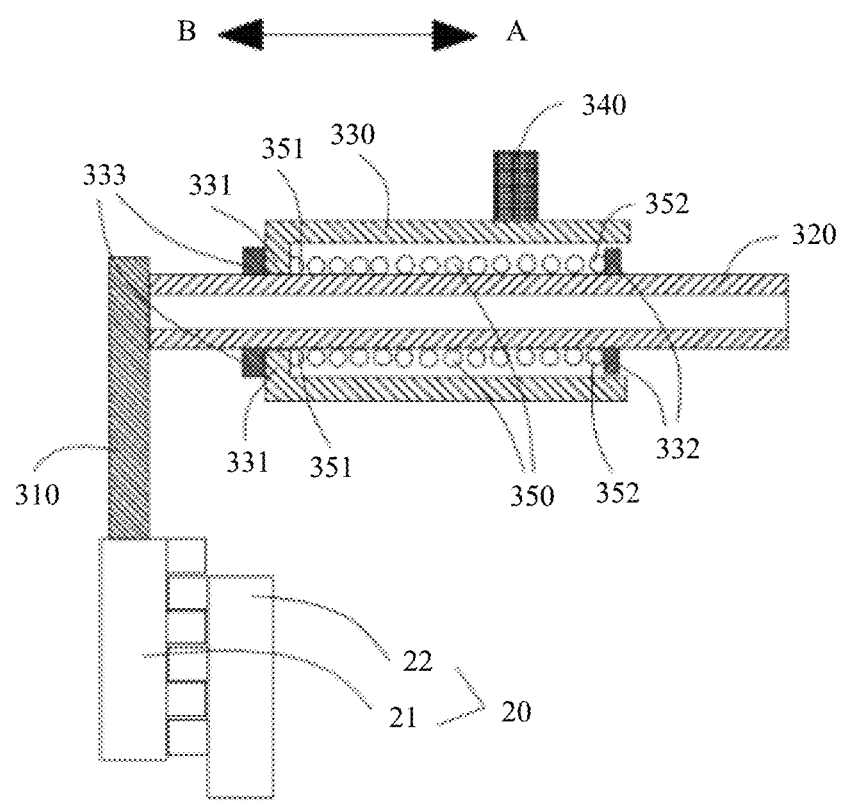
FIG. 8 is a cross-sectional view of a first shifting structure according to an implementation of this application.

Refer to FIG. 8. A difference from the implementation shown in FIG. 5 lies in that, in a possible implementation, the two ends of the elastic component 350 abut against the first limiting portion 331 and the second limiting portion 332 respectively. Abutting means that two parts are not fixedly connected, but are adjacent in locations. In this implementation, a blocking portion 333 is further disposed on a side, of the first limiting portion 331, that is away from the second limiting portion 332, and the blocking portion 333 is fixedly connected to the inner shaft 320. When the outer hub 330 is pushed in the axial direction toward the direction B, the outer hub 330 abuts against the blocking portion 333, and drives the inner shaft 320 to move in the axial direction toward the direction B. In this implementation, the two ends of the elastic component 350 are not fixedly connected to the first limiting portion 331 or the second limiting portion 332. Therefore, when there is no blocking portion 333, when the outer hub 330 moves in the axial direction toward the direction B, the first limiting portion 331 detaches from the elastic component 350, and the inner shaft 320 cannot be driven to move in the axial direction toward the direction B. In this case, the blocking portion 333 needs to be added, so that the first limiting portion 331 pushes the blocking portion 333, to drive the inner shaft 320 to move.

In some implementations, the first end 351 of the elastic component 350 may be fixedly connected to the first limiting portion 331, and the second end 352 of the elastic component 350 may abut against the second limiting portion 332. Alternatively, in some implementations, the first end 351 of the elastic component 350 abuts against the first limiting portion 331, and the second end 352 of the elastic component 350 is fixedly connected to the second limiting portion 332.

Figure 9:
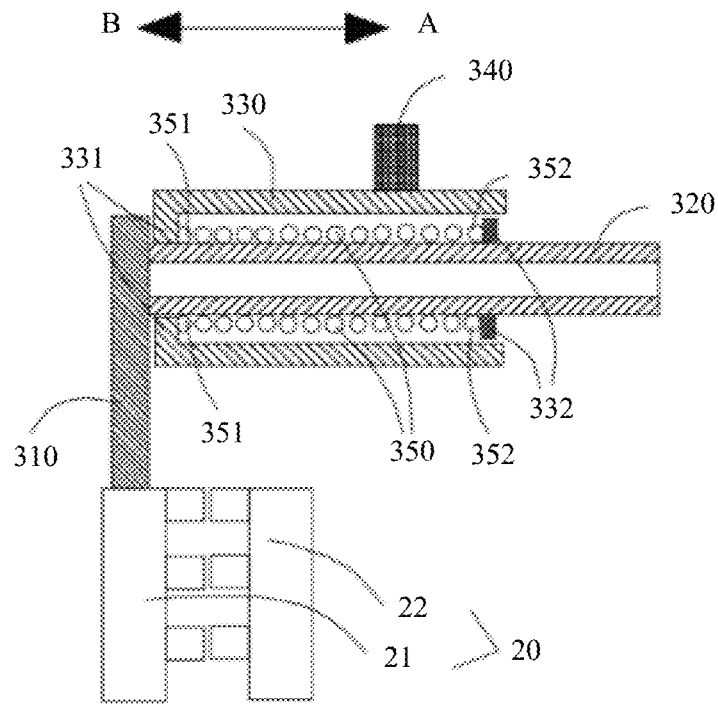
FIG. 9 is a cross-sectional view of a first shifting structure according to an implementation of this application.

Refer to FIG. 9. A difference from the implementation shown in FIG. 8 lies in that, there is no blocking portion 333 on the inner shaft 320, but the first shifting fork 310 is adjacent to the first limiting portion 331. Orthographic projections of the first limiting portion 331 and the first shifting fork 310 on a radial profile of the inner shaft 320 at least partially overlap. Therefore, when the outer hub 330 moves in the axial direction toward the direction B, the first limiting portion 331 pushes the first shifting fork 310 and the inner shaft 320 to move. It should be noted that, that "the first shifting fork 310 is adjacent to the first limiting portion 331" means that the first shifting fork 310 is adjacent to the first limiting portion 331 before the outer hub 330 moves relative to the inner shaft 320 in the axial direction toward the direction A. When the outer hub 330 is pushed back in the axial direction toward the direction B after the inner shaft 320 moves in the axial direction toward the direction A and reaches the target location, the outer hub 300 returns to an original location, and continues to push the first shifting fork 310 to move in the axial direction toward the direction B.

Figure 10:
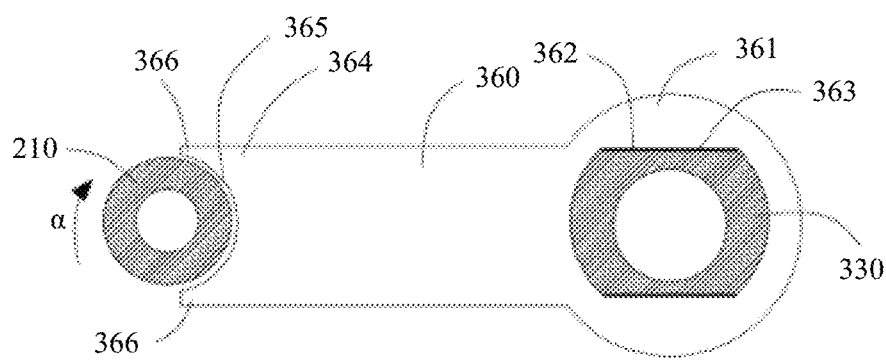
FIG. 10 is a schematic diagram of locations of a hub-rotation limiting component, a gear shifting shaft, and an outer hub according to an implementation of this application.

Refer to FIG. 3 and FIG. 10. In a possible implementation, the first shifting mechanism 300 further includes the hub-rotation limiting component 360. One end of the hub-rotation limiting component 360 is disposed with a first limiting portion 361 sleeved on the outer hub 330. A first limiting plane 362 is disposed on an inner surface of the first limiting portion 361. A second limiting plane 363 matching the first limiting plane 362 is disposed on the outer hub 330. The first limiting plane 362 is attached to the second limiting plane 363. The other end of the hub-rotation limiting component 360 is disposed with a second limiting portion 364. The second limiting portion 364 includes a limiting curved surface 365 that is concave toward the first limiting portion 361. The limiting curved surface 365 surrounds a part of a surface of the gear shifting shaft 210 and is spaced from the gear shifting shaft 210. The outer hub 330 cannot rotate on its own axis under actions of the first limiting plane 362, the second limiting plane 363, and the limiting curved surface 365.

Figure 11:
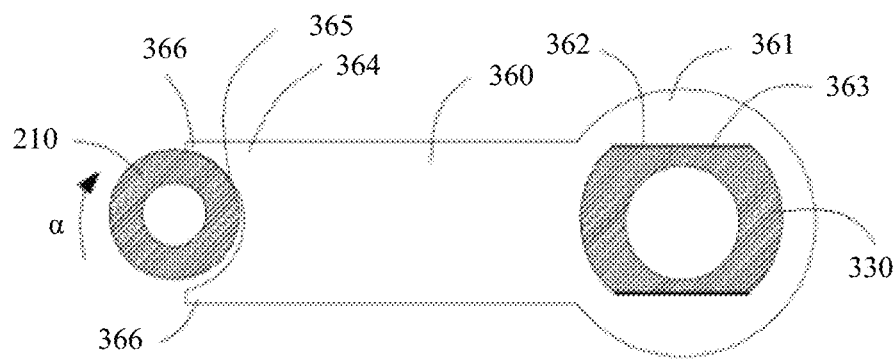
FIG. 11 is a schematic diagram of locations of a hub-rotation limiting component, a gear shifting shaft, and an outer hub according to an implementation of this application.

As shown in FIG. 3, when the gear shifting shaft 210 rotates in a clockwise direction α, because the first guiding contour 220 has a path in the axial direction and a path in the circumferential direction, a wall of the first guiding contour 220 also has an acting force in the axial direction and an acting force in a counterclockwise direction β on the first coupling pin 340. The acting force in the counterclockwise direction β causes a tendency that the outer hub 330 connected to the first coupling pin 340 rotates around an axis of the outer hub 330, and a tendency that the first coupling pin 340 detaches from the first guiding contour 220. However, due to limiting actions of the first limiting plane 345 and the second limiting plane 363, the first limiting portion 361 and the outer hub 330 remain fixed relative to each other, that is, the outer hub 330 cannot rotate on its own axis relative to the first limiting portion 361. When the outer hub 330 is to rotate around an axial direction of the outer hub 330, the limiting curved surface 365 of the second limiting portion 364 abuts against the gear shifting shaft 210, and end points 366 of the limiting curved surface 365 press against the gear shifting shaft 210. Therefore, the first limiting portion 361 in the hub-rotation limiting component 360 cannot rotate, the outer hub 330 cannot rotate on its own axis (as shown in FIG. 11), and the first coupling pin 340 fixedly connected to the outer hub 330 cannot rotate around the axial direction of the outer hub 330. This prevents the first coupling pin 340 from detaching from the first guiding contour 220, so that the first coupling pin 340 can only keep moving in the axial direction. In this implementation, the gear shifting shaft 210 can overcome a friction force between the limiting curved surface 365 and the gear shifting shaft 210, and rotate around the axial direction of the gear shifting shaft 210.

It should be noted that the hub-rotation limiting component 360 may alternatively have another structure. This is not limited in this application, provided that the outer hub 330 is prevented from rotating on its own axis around the axial direction of the outer hub 330 when the gear shifting shaft 210 rotates.

Continue to refer to FIG. 1. In a possible implementation, the gear shifting mechanism 10 further includes a worm 401 and a worm gear 402 that are meshed with each other. The worm 401 is connected to the drive motor 100. The worm gear 402 is sleeved on the gear shifting shaft 210 and is fixedly connected to the gear shifting shaft 210. When the drive motor 100 operates, the worm 401 is driven to rotate, and the worm drives the worm gear 402 to rotate, so as to drive the gear shifting shaft 210 to rotate. In this implementation, a power of the drive motor 100 is transmitted to the gear shifting shaft 210 by using the worm 401 and the worm gear 402. This saves space compared with power transmission by using two or more gears.

Continue to refer to FIG. 2. In a possible implementation, the shifting drum 200 further includes a second guiding contour 230 disposed in the circumferential direction of the gear shifting shaft 210. The second guiding contour 230 has a path in the axial direction of the gear shifting shaft 210. The path of the second guiding contour 230 encircles the gear shifting shaft 210 once in the circumferential direction of the gear shifting shaft 210, and has a specific path in the axial direction of the gear shifting shaft 210. In other words, an orthographic projection of the second guiding contour 230 in the axial direction of the gear shifting shaft 210 is a straight line with a specific length. Therefore, a component located in the second guiding contour 230 can be guided to move in the axial direction of the gear shifting shaft 210. A specific path of the second guiding contour 230 may be arranged according to an actual requirement. The second guiding contour 230 is but is not limited to a groove type guiding contour or an opening type guiding contour, and is an opening type guiding contour in this implementation.

Figure 12:
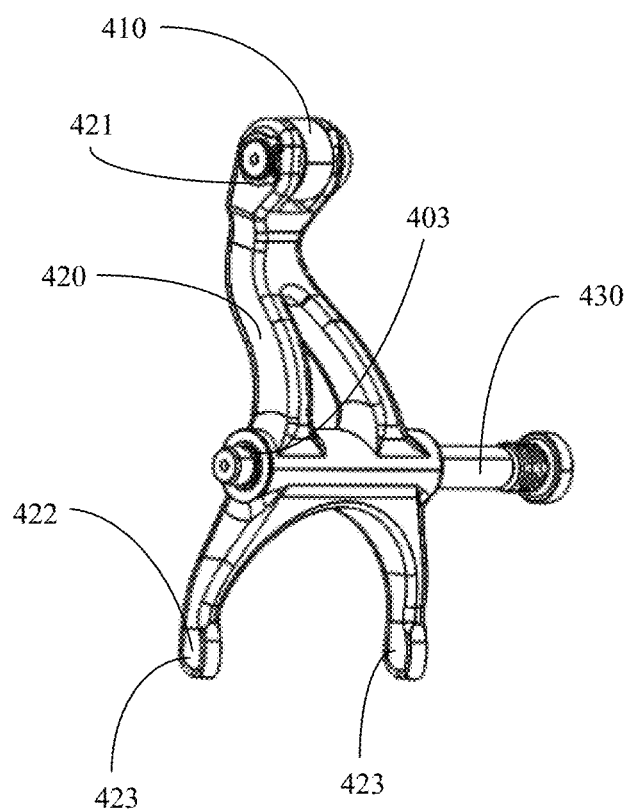
FIG. 12 is a schematic diagram of a structure of a second shifting structure according to an implementation of this application.

Continue to refer to FIG. 1 and FIG. 12. The gear shifting mechanism 10 further includes a second shifting mechanism 400. The second shifting mechanism 400 includes a second coupling pin 410, a second shifting fork 420, and a supporting shaft 430. The second coupling pin 410 is connected to a first end 421 of the second shifting fork 420 and is located in the second guiding contour 230 (as shown in FIG. 3). A via 403 is disposed in the middle of the second shifting fork 420. The supporting shaft 430 is inserted into the via 403. When the gear shifting shaft 210 rotates, the second coupling pin 410 and the first end 421 of the second shifting fork 420 are pushed to slide in the axial direction of the gear shifting shaft 210, and a second end 422 of the second shifting fork 420 moves in a direction opposite to that of the first end 421 of the second shifting fork 420 through the supporting shaft 430.

The supporting shaft 430 may be fixed to the housing of the gear shifting mechanism 10 or a housing of the two-speed gearbox. The supporting shaft 430 is fixed, and the supporting shaft 430 is inserted into the via 403 to constitute a fixed support of the second shifting fork 420. The second shifting fork 420 is capable of rotating relative to the supporting shaft 430.

In this implementation, the second guiding contour 230 and the worm gear 402 are fixedly connected, and may be integrally formed to save space.

When the second end 422 of the second shifting fork 420 moves, connection and disconnection of a second gear shifting connection mechanism 30 is controlled. The second gear shifting connection mechanism 30 is capable of switching between a connected state and a disconnected state (as shown in FIG. 17). The second shift coupling mechanism 30 is a component in a second gear apparatus of the two-speed gearbox 40. The second gear shifting connection mechanism 30 is configured to connect a second gear 43 and a second rotary shaft 44 in the second gear apparatus. When the second gear shifting connection mechanism 30 is in the connected state, the second gear 43 is connected to the second rotary shaft 44. In this case, the two-speed gearbox 40 may transmit a second shifting power through the second gear 43 and the second rotary shaft 44. The second shifting power is at a high gear. When the second gear shifting connection mechanism 30 is in the disconnected state, the second gear 43 is disconnected from the second rotary shaft 44. In this case, no second shifting power can be transmitted between the second gear 43 and the second rotary shaft 44.

In a possible implementation, the second shifting mechanism 400 further includes a push pin 440 (as shown in FIG. 1), and the second end 422 of the second shifting fork 420 abuts against one end of the push pin 440. The other end of the push pin 440 is configured to be connected to the second gear shifting connection mechanism 30.

In a possible implementation, a distance between the first end 421 of the second shifting fork 420 and the supporting shaft 430 is greater than a distance between the second end 422 of the second shifting fork 420 and the supporting shaft 430 (as shown in FIG. 12). The supporting shaft 430 forms a lever, so that the distance between the first end 421 of the second shifting fork 420 and the supporting shaft 430 is greater than the distance between the second end 422 of the second shifting fork 420 and the supporting shaft 430. This can amplify an acting force of the second end 422 of the second shifting fork 420, and therefore can effectively control connection and disconnection of the second gear shifting connection mechanism 30.

Figure 13:
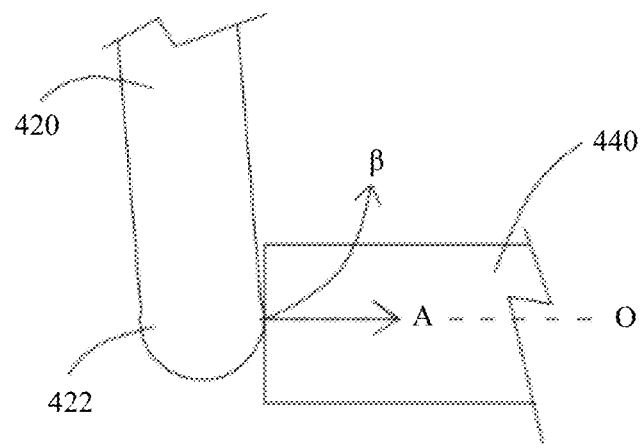
FIG. 13 is a schematic diagram of locations of a second shifting fork and a push pin in a second shifting structure according to an implementation of this application.

In a possible implementation, an end face, used to act on the second gear shifting connection mechanism 30, of the second end 422 of the second shifting fork 420 is an arc surface (as shown in FIG. 12). After an acting force of the shifting drum 200 is applied to the second shifting fork 420 by using the lever, the second end 422 of the second shifting fork 420 moves upward or downward in an arc shape. The end face of the second end 422 is set to be an arc surface. Therefore, it can be ensured that the end face of the second end 422 of the second shifting fork 420 always abuts against the push pin 440. Further, it can be ensured that an acting force in the axial direction can still be applied to the push pin 440 when the second end 422 moves in an arc shape. As shown in FIG. 13, the arc end face of the second end 422 abuts against the push pin 440. When the second shifting fork 420 rotates in the counterclockwise direction β under actions of the shifting drum 200 and the supporting shaft 430, the arc end face of the second end 422 can continuously abut against a central axis O of the push pin 440, thereby ensuring a smoother pushing force in an axial direction of the push pin 440 toward the direction A.

In a possible implementation, the second end 422 of the second shifting fork 420 includes at least two supporting points 423 (as shown in FIG. 12). In other words, there may be a plurality of supporting points 423. The plurality of supporting points 423 can increase a contact area of an acting force, so that a force applied to the second gear shifting connection mechanism 30 is more uniform. A quantity of push pins 440 is the same as that of supporting points 423.

Figure 14:
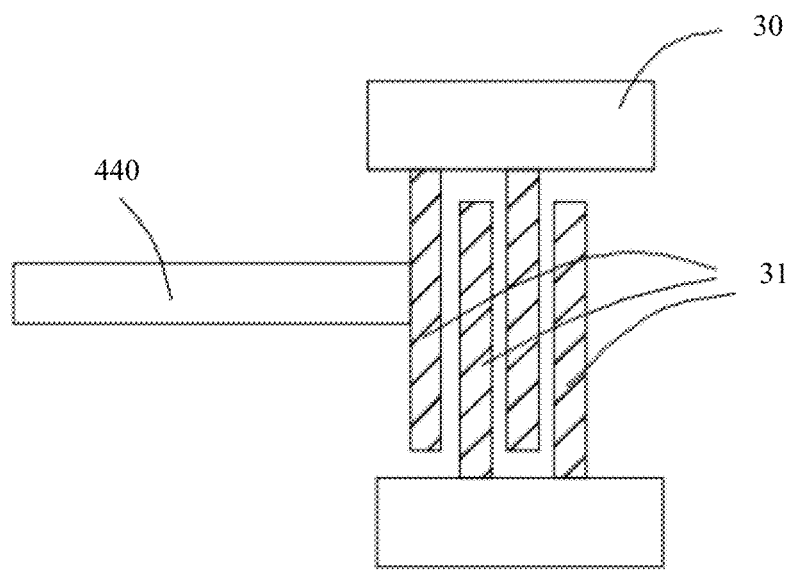
FIG. 14 is a schematic diagram of locations of a push pin and a friction clutch according to an implementation of this application.
Figure 15:
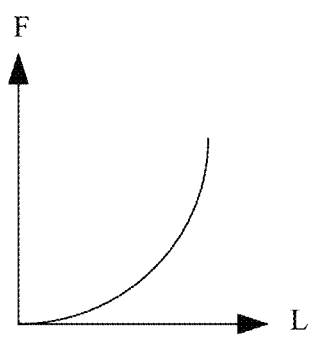
FIG. 15 is a diagram of a relationship between a value of a friction force between a plurality of friction plates, and an axial distance of a push pin according to an implementation of this application.

In a possible implementation, the second end 422 of the second shifting fork 420 is configured to be disconnected from and connected to the second gear shifting connection mechanism 30. The second gear shifting connection mechanism 30 is a friction clutch. A path, in the second guiding contour 230, that is used to control connection and disconnection of the friction clutch is a curved path (as shown in FIG. 2). Refer to FIG. 14. The friction clutch 30 includes a plurality of friction plates 31. When an external force acts on the plurality of friction plates 31, the friction plates 31 are gradually combined to transmit the acting force. In this case, the friction clutch 30 is in a connected state. In this implementation, the second end 422 of the second shifting fork 420 pushes the push pin 440 to move in the axial direction, and the push pin 440 acts on the plurality of friction plates 31. The plurality of friction plates 31 can be combined when the push pin 440 moves in the axial direction. A relationship between a value of a friction force F between the plurality of friction plates 31 and an axial distance L by which the push pin 440 pushes the friction plates 31 to move is a curve relationship (as shown in FIG. 15). Therefore, the path, in the second guiding contour 230, that is used to control connection and disconnection of the friction clutch 30 is set to be a curved path. This is more suitable for a torque curve of the friction clutch 30, so that the friction clutch 30 is disconnected and connected more smoothly, and therefore a power is transmitted more stably. The friction clutch 30 may be a normally open clutch or a normally closed clutch. It should be noted that a structure of the friction clutch 30 is not limited to the structure shown in FIG. 12, and may be arranged according to an actual requirement. This is not limited in this application. FIG. 15 is merely intended to show that the value of the friction force F between the friction plates 31 and the axial distance L by which the second shifting fork 420 pushes the friction plates 31 to move are in a curve relationship, but does not indicate an actual curve relationship. A curve relationship needs to be set according to an actual requirement.

Figure 16:
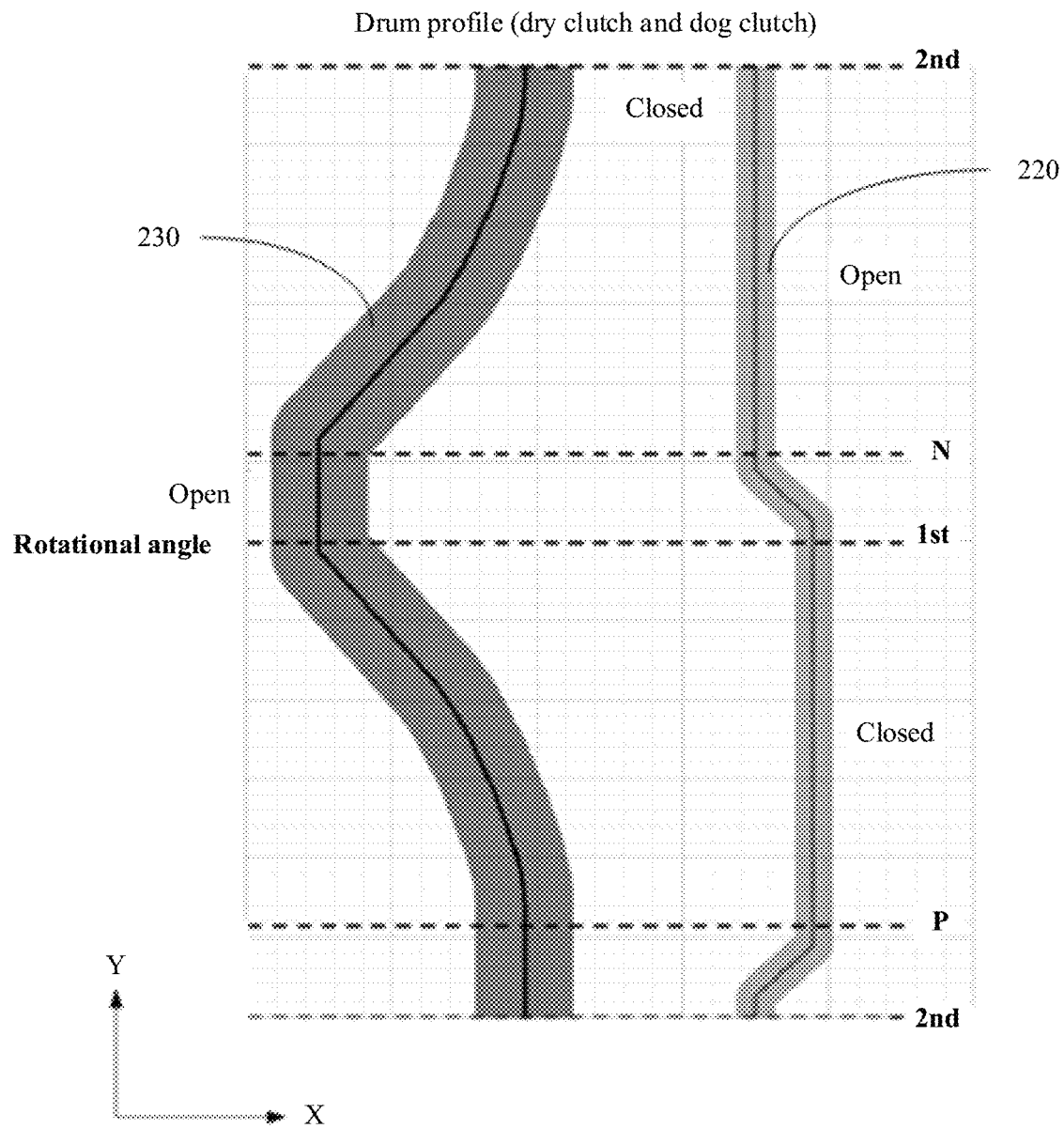
FIG. 16 is a schematic expanded view of paths of a first guiding contour and a second guiding contour according to an implementation of this application.

The following describes an operating process of the gear shifting mechanism 10 in this implementation with reference to FIG. 1, FIG. 16, and FIG. 17. FIG. 16 shows expanded paths of the first guiding contour 220 and the second guiding contour 230 in the shifting drum 200. In FIG. 16, a first direction X indicates a distance by which the first coupling pin 340 or the second coupling pin 410 moves in the axial direction of the gear shifting shaft 210, and a second direction Y indicates a circumferential rotation angle of the gear shifting shaft 210. A total rotation angle in the second direction Y is 360°.

In a case of an N gear, the first coupling pin 340 is at a location at which the path of the first guiding contour 220 is open, and the second coupling pin 410 is at a location at which the path of the second guiding contour 230 is open. The "location at which the path of the first guiding contour 220 is open" indicates that the first gear shifting connection mechanism 20 is in the disconnected state. In this case, the first gear 41 and the first rotary shaft 42 in the first gear apparatus 45 are disconnected. The "location at which the path of the second guiding contour 230 is open" indicates that the second gear shifting connection mechanism 30 is in the disconnected state. In this case, the second gear 43 and the second rotary shaft 44 in the second gear apparatus 46 are disconnected.

In a case of a 1st gear, where the 1st gear is a low gear, that is, a power is transmitted at the first gear, the first coupling pin 340 is at a location at which the path of the first guiding contour 220 is closed, and the second coupling pin 410 is at a location at which the path of the second guiding contour 230 is closed. The "location at which the path of the first guiding contour 220 is closed" indicates that the first gear shifting connection mechanism 20 is in the connected state. In this case, the first gear 41 and the first rotary shaft 42 in the first gear apparatus 45 are connected, and the first rotary shaft 42 drives the first gear 41 on the first rotary shaft 42 to rotate. The "location at which the path of the second guiding contour 230 is open" indicates that the second gear shifting connection mechanism 30 is in the disconnected state. In this case, the second gear 43 and the second rotary shaft 44 in the second gear apparatus 46 are disconnected. That is, in the case of the 1st gear, the first gear 41 and the first rotary shaft 42 in the first gear apparatus 45 transmit a power, and the second gear 43 and the second rotary shaft 44 in the second gear apparatus 46 have a speed difference and do not transmit a power.

In a case of a 2nd gear, where the 2nd gear is a high gear, that is, a power is transmitted at the second gear, the first coupling pin 340 is at a location at which the path of the first guide groove 220 is open, and the second coupling pin 410 is at a location at which the path of the second guiding contour 230 is closed. The "location at which the path of the first guiding contour 220 is open" indicates that the first gear shifting connection mechanism 20 is in the disconnected state. In this case, the first gear 41 and the first rotary shaft 42 in the first gear apparatus 45 are disconnected, and the first rotary shaft 42 cannot drive the first gear 41 on the first rotary shaft 42 to rotate. The "location at which the path of the second guiding contour 230 is closed" indicates that the second gear shifting connection mechanism 30 is in the connected state. In this case, the second gear 43 and the second rotary shaft 44 in the second gear apparatus 46 are connected, and the second rotary shaft 44 drives the second gear 43 to rotate. That is, in the case of the 2nd gear, the first gear 41 and the first rotary shaft 42 in the first gear apparatus 45 have a speed difference and do not transmit a power, and the second gear 43 and the second rotary shaft 44 in the second gear apparatus 46 transmit a power.

In a case of a P position, the first coupling pin 340 is at a location at which the path of the first guiding contour 220 is closed, and the second coupling pin 410 is at a location at which the path of the second guiding contour 230 is closed, to connect the first gear 41 and the first rotary shaft 42 in the first gear apparatus 45, and connect the second gear 43 and the second rotary shaft 44 in the second gear apparatus 46. In this case, the first gear apparatus 45 and the second gear apparatus 46 simultaneously transmit powers, thereby causing a mutual lockup.

As shown in FIG. 16, the path of the second guiding contour 230 is a curve in a process of switching from the 2nd gear to the N gear and a process of switching from the 1st gear to the P position, so that a power is transmitted more smoothly.

It should be noted that the four states in FIG. 16 may be switched according to a requirement, including but not limited to switching from the 1st gear to the 2nd gear, switching from the 1st gear to the N gear, switching from the 2nd gear to the N gear, switching from the 1st gear to the P position, and switching from the 2nd gear to the P position.

Refer to FIG. 17. An implementation of this application further provides a two-speed gearbox 40. The two-speed gearbox 40 includes a first gear shifting connection mechanism 20 and the gear shifting mechanism 10 according to any one of the foregoing implementations. The first shifting fork 310 controls connection and disconnection of the first gear shifting connection mechanism 20 through axial movement.

The two-speed gear shifting mechanism 40 further includes a second gear shifting connection mechanism 30. The second shifting fork 420 controls connection and disconnection of the second gear shifting connection mechanism 30 through axial movement.

The two-speed gearbox 40 further includes a first gear apparatus 45 and a second gear apparatus 46. The first gear apparatus 45 includes a first gear 41 and a first rotary shaft 42. When the first gear shifting connection mechanism 20 is in a connected state, the first gear 41 is connected to the first rotary shaft 42. In this case, the two-speed gearbox 40 may transmit a first shifting power through the first gear 41 and the first rotary shaft 42. The first shifting power is at a low gear. When the first gear shifting connection mechanism 20 is in a disconnected state, the first gear 41 is disconnected from the first rotary shaft 42. In this case, no first shifting power can be transmitted between the first gear 41 and the first rotary shaft 42. The second gear apparatus 46 includes a second gear 43 and a second rotary shaft 44. When the second gear shifting connection mechanism 30 is in a connected state, the second gear 43 is connected to the second rotary shaft 44. In this case, the two-speed gearbox 40 may transmit a second shifting power through the second gear 43 and the second rotary shaft 44. The second shifting power is at a high gear. When the second gear shifting connection mechanism 30 is in a disconnected state, the second gear 43 is disconnected from the second rotary shaft 44. In this case, no second shifting power can be transmitted between the second gear 43 and the second rotary shaft 44.

One of the first rotary shaft 42 and the second rotary shaft 44 may be an input shaft, the other may be an intermediate shaft. In some cases, the first rotary shaft 42 and the second rotary shaft 44 may be a same rotary shaft. In some cases, the first gear 41 and the second gear 43 each may include two or more gears. It should be noted that an exemplary structure of the two-speed gearbox 40 in this application is not limited to the structure shown in FIG. 17, and a gear and a rotary shaft may be disposed according to an actual requirement.

Figure 18:
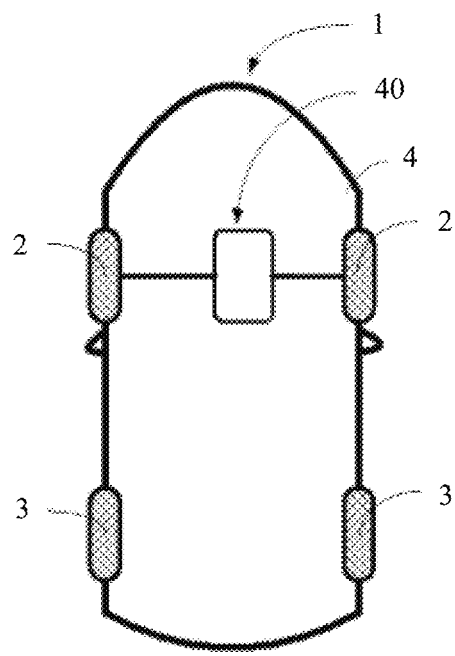
FIG. 18 is a schematic diagram of a structure of a vehicle according to an implementation of this application.

Refer to FIG. 18, an implementation of this application further provides a vehicle 1. The vehicle 1 includes front wheels 2, rear wheels 3, a vehicle body 4 connected between the front wheels 2 and the rear wheels 3, and the foregoing two-speed gearbox 40. The two-speed gearbox 40 is mounted on the vehicle body 4. The vehicle 1 further includes a final gear and a differential. An intermediate shaft in the two-speed gearbox 40 is connected to the final gear. The differential is connected between two front wheels 2 or between the front wheels 2 and the rear wheels 3. The final gear can reduce a rotational speed of the intermediate shaft. The differential is configured to adjust a difference between rotational speeds of gears. The vehicle 1 includes an automobile, an electric vehicle, or a special operation vehicle. The electric vehicle includes a two-wheeled, three-wheeled, or four-wheeled electric vehicle. The special operation vehicle includes a variety of vehicles with specific functions, for example, an engineering rescue vehicle, a sprinkler vehicle, a sewage suction vehicle, a cement mixer truck, a lifting vehicle, and a medical vehicle.

The foregoing describes in detail the gear shifting mechanism, the two-speed gearbox, and the vehicle provided in the embodiments of this application. Exemplary examples are used in this specification to describe the principles and the embodiments of this application. The descriptions of the foregoing embodiments are merely intended to help understand the method of this application and the core ideas thereof. In addition, a person of ordinary skill in the art may change the exemplary embodiments and the application scope based on the ideas of this application. To sum up, the content of this specification shall not be construed as a limitation on this application.

What is claimed is:

1. A gear shifting mechanism, comprising:
   a drive motor;
   a shifting drum; and
   a first shifting mechanism, wherein
   the shifting drum comprises a gear shifting shaft and a first guiding contour disposed in a circumferential direction of the gear shifting shaft, the first guiding contour has a path in an axial direction of the gear shifting shaft, and the drive motor is configured to drive the gear shifting shaft to rotate around the axial direction of the gear shifting shaft;
   wherein the first shifting mechanism comprises an inner shaft, an outer hub, a first coupling pin, a first shifting fork, and an elastic component, the outer hub is sleeved on the inner shaft and is configured to move relative to an axial direction of the inner shaft, the outer hub and the gear shifting shaft are movably connected in the axial direction of the gear shifting shaft, the outer hub and the gear shifting shaft are fixedly connected in the circumferential direction of the gear shifting shaft, one end of the first coupling pin is fixed on an outer side of the outer hub, the other end of the first coupling pin is inserted into the first guiding contour and is configured to slide in the first guiding contour, and the first shifting fork is fixed on the inner shaft and is located on the outer side of the outer hub; and
   wherein the elastic component is sleeved on the inner shaft and is located between the inner shaft and the outer hub, there is a first limiting portion and a second limiting portion between the outer hub and the inner shaft, the second limiting portion is located on a side of the first limiting portion, that is away from the first shifting fork, the elastic component is located between the first limiting portion and the second limiting portion in the axial direction of the inner shaft, the first limiting portion is connected to one of the outer hub and the inner shaft, and the second limiting portion is connected to the other of the outer hub and the inner shaft, and
   wherein the first shifting mechanism further comprises a hub-rotation limiting component, one end of the hub-rotation limiting component is disposed with a third limiting portion sleeved on the outer hub, a first limiting plane is disposed on an inner surface of the third limiting portion, a second limiting plane matching the first limiting plane is disposed on the outer hub, the first limiting plane is attached to the second limiting plane, the other end of the hub-rotation limiting component is disposed with a fourth limiting portion, the fourth limiting portion comprises a limiting curved surface that is concave toward the third limiting portion, and the limiting curved surface surrounds a part of a surface of the gear shifting shaft and is spaced from the gear shifting shaft.

2. The gear shifting mechanism according to claim 1, wherein two ends of the elastic component are fixedly connected to the first limiting portion and the second limiting portion respectively.

3. The gear shifting mechanism according to claim 1, wherein two ends of the elastic component abut against the first limiting portion and the second limiting portion respectively.

4. The gear shifting mechanism according to claim 1, wherein the gear shifting mechanism further comprises a worm and a worm gear that are meshed with each other, the worm is connected to the drive motor, and the worm gear is sleeved on the gear shifting shaft and is fixedly connected to the gear shifting shaft; and when the drive motor operates, the worm is driven to rotate, the worm drives the worm gear to rotate, and the worm gear drives the gear shifting shaft to rotate.

5. The gear shifting mechanism according to claim 1, wherein the shifting drum further comprises a second guiding contour disposed in the circumferential direction of the gear shifting shaft, and the second guiding contour has a path in the axial direction of the gear shifting shaft; and the gear shifting mechanism further comprises a second shifting mechanism, the second shifting mechanism comprises a second coupling pin, a second shifting fork, and a supporting shaft, the second coupling pin is connected to a first end of the second shifting fork and is located in the second guiding contour, a via is disposed in the middle of the second shifting fork, the supporting shaft is inserted into the via, and the second shifting fork is configured to rotate relative to the supporting shaft; and when the gear shifting shaft rotates, the second coupling pin and the first end of the first shifting fork are pushed to slide in the axial direction of the gear shifting shaft, and a second end of the second shifting fork moves in a direction opposite to that of the first end of the first shifting fork through the supporting shaft.

6. The gear shifting mechanism according to claim 5, wherein a distance between the first end of the second shifting fork and the supporting shaft is greater than a distance between the second end of the second shifting fork and the supporting shaft.

7. The gear shifting mechanism according to claim 6, wherein an end face of the second end of the second shifting fork is an arc surface.

8. The gear shifting mechanism according to claim 6, wherein the second end of the second shifting fork comprises at least two supporting points.

9. The gear shifting mechanism according to claim 5, wherein the second shifting mechanism further comprises a push pin, and the second end of the second shifting fork abuts against one end of the push pin.

10. The gear shifting mechanism according to claim 5, wherein the second end of the second shifting fork is configured to be disconnected from and connected to a second gear shifting connection mechanism, the second gear shifting connection mechanism is a friction clutch, and a path, in the second guiding contour, that controls connection and disconnection of the friction clutch, is a curved path.

11. A two-speed gearbox, comprising:
a first gear shifting connection mechanism; and
a gear shifting mechanism,
wherein the gear shifting mechanism comprises a drive motor, a shifting drum, and a first shifting mechanism, wherein
the shifting drum comprises a gear shifting shaft and a first guiding contour disposed in a circumferential direction of the gear shifting shaft, the first guiding contour has a path in an axial direction of the gear shifting shaft, and the drive motor is configured to drive the gear shifting shaft to rotate around the axial direction of the gear shifting shaft;
wherein the first shifting mechanism comprises an inner shaft, an outer hub, a first coupling pin, a first shifting fork, and an elastic component, the outer hub is sleeved on the inner shaft and is configured to move relative to an axial direction of the inner shaft, the outer hub and the gear shifting shaft are movably connected in the axial direction of the gear shifting shaft, the outer hub and the gear shifting shaft are fixedly connected in the circumferential direction of the gear shifting shaft, one end of the first coupling pin is fixed on an outer side of the outer hub, the other end of the first coupling pin is inserted into the first guiding contour and is configured to slide in the first guiding contour, and the first shifting fork is fixed on the inner shaft and is located on the outer side of the outer hub; and wherein the elastic component is sleeved on the inner shaft and is located between the inner shaft and the outer hub, there is a first limiting portion and a second limiting portion between the outer hub and the inner shaft, the second limiting portion is located on a side of the first limiting portion, that is away from the first shifting fork, the elastic component is located between the first limiting portion and the second limiting portion in the axial direction of the inner shaft, the first limiting portion is connected to one of the outer hub and the inner shaft, and the second limiting portion is connected to the other of the outer hub and the inner shaft;

wherein the first gear shifting connection mechanism is connected to the first shifting fork, and the first shifting fork controls connection and disconnection of the first gear shifting connection mechanism through axial movement, and wherein the first shifting mechanism further comprises a hub-rotation limiting component, one end of the hub-rotation limiting component is disposed with a third limiting portion sleeved on the outer hub, a first limiting plane is disposed on an inner surface of the third limiting portion, a second limiting plane matching the first limiting plane is disposed on the outer hub, the first limiting plane is attached to the second limiting plane, the other end of the hub-rotation limiting component is disposed with a fourth limiting portion, the fourth limiting portion comprises a limiting curved surface that is concave toward the third limiting portion, and the limiting curved surface surrounds a part of a surface of the gear shifting shaft and is spaced from the gear shifting shaft.

12. The two-speed gearbox according to claim 11, wherein two ends of the elastic component are fixedly connected to the first limiting portion and the second limiting portion respectively.

13. The two-speed gearbox according to claim 11, wherein two ends of the elastic component abut against the first limiting portion and the second limiting portion respectively.

14. A vehicle, comprising:
front wheels;
rear wheels;
a vehicle body connected between the front wheels and the rear wheels; and
a two-speed gearbox,
wherein the two-speed gearbox comprises a first gear shifting connection mechanism and a gear shifting mechanism, wherein the gear shifting mechanism comprises a drive motor, a shifting drum, and a first shifting mechanism, wherein
the shifting drum comprises a gear shifting shaft and a first guiding contour disposed in a circumferential direction of the gear shifting shaft, the first guiding contour has a path in an axial direction of the gear shifting shaft, and the drive motor is configured to drive the gear shifting shaft to rotate around the axial direction of the gear shifting shaft;
wherein the first shifting mechanism comprises an inner shaft, an outer hub, a first coupling pin, a first shifting fork, and an elastic component, the outer hub is sleeved on the inner shaft and is configured to move relative to an axial direction of the inner shaft, the outer hub and the gear shifting shaft are movably connected in the axial direction of the gear shifting shaft, the outer hub and the gear shifting shaft are fixedly connected in the circumferential direction of the gear shifting shaft, one end of the first coupling pin is fixed on an outer side of the outer hub, the other end of the first coupling pin is inserted into the first guiding contour and is configured to slide in the first guiding contour, and the first shifting fork is fixed on the inner shaft and is located on the outer side of the outer hub; and wherein the elastic component is sleeved on the inner shaft and is located between the inner shaft and the outer hub, there is a first limiting portion and a second limiting portion between the outer hub and the inner shaft, the second limiting portion is located on a side of the first limiting portion, that is away from the first shifting fork, the elastic component is located between the first limiting portion and the second limiting portion in the axial direction of the inner shaft, the first limiting portion is connected to one of the outer hub and the inner shaft, and the second limiting portion is connected to the other of the outer hub and the inner shaft;

wherein the first gear shifting connection mechanism is connected to the first shifting fork, and the first shifting fork controls connection and disconnection of the first gear shifting connection mechanism through axial movement;

and the two-speed gearbox is mounted on the vehicle body, wherein the first shifting mechanism further comprises a hub-rotation limiting component, one end of the hub-rotation limiting component is disposed with a third limiting portion sleeved on the outer hub, a first limiting plane is disposed on an inner surface of the third limiting portion, a second limiting plane matching the first limiting plane is disposed on the outer hub, the first limiting plane is attached to the second limiting plane, the other end of the hub-rotation limiting component is disposed with a fourth limiting portion, the fourth limiting portion comprises a limiting curved surface that is concave toward the third limiting portion, and the limiting curved surface surrounds a part of a surface of the gear shifting shaft and is spaced from the gear shifting shaft.

15. The vehicle according to claim 14, wherein two ends of the elastic component are fixedly connected to the first limiting portion and the second limiting portion respectively.

16. The vehicle according to claim 14, wherein two ends of the elastic component abut against the first limiting portion and the second limiting portion respectively.

* * * * *